Sept. 2, 1952     J. FAULKNER ET AL     2,609,240
CONTROLLED DISCHARGE FOAM NOZZLE
Filed Dec. 13, 1949     3 Sheets-Sheet 1
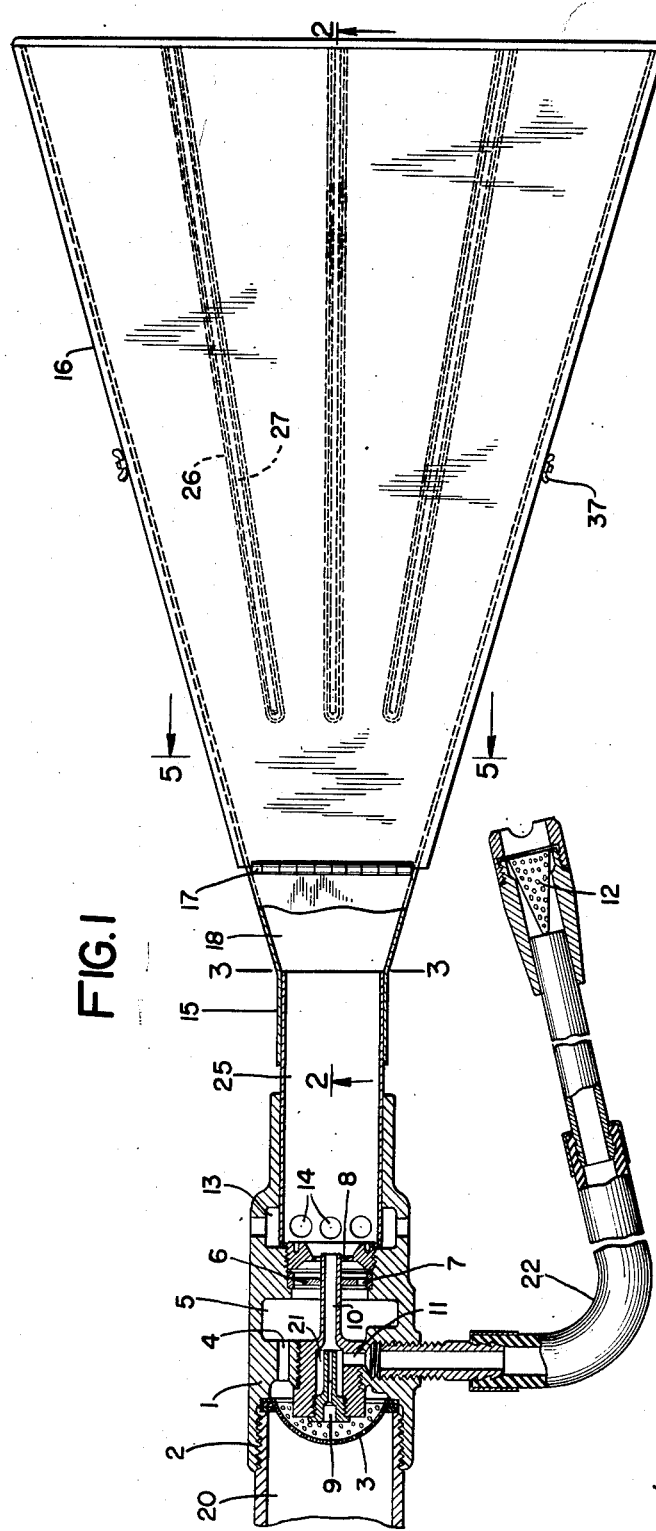
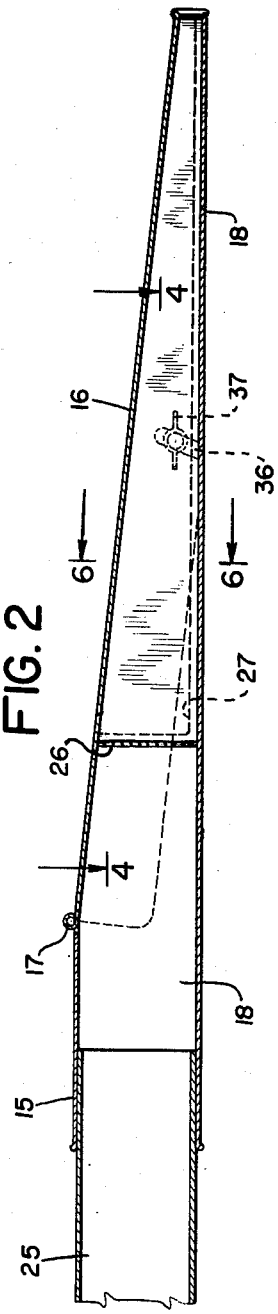
INVENTORS.
JAMES FAULKNER
AUGUST TOTH
BY *H. C. [signature]*
ATTORNEY.

Sept. 2, 1952   J. FAULKNER ET AL   2,609,240
CONTROLLED DISCHARGE FOAM NOZZLE
Filed Dec. 13, 1949   3 Sheets-Sheet 2

INVENTORS.
JAMES FAULKNER
AUGUST TOTH
BY
ATTORNEY.

Sept. 2, 1952     J. FAULKNER ET AL     2,609,240
CONTROLLED DISCHARGE FOAM NOZZLE
Filed Dec. 13, 1949     3 Sheets-Sheet 3
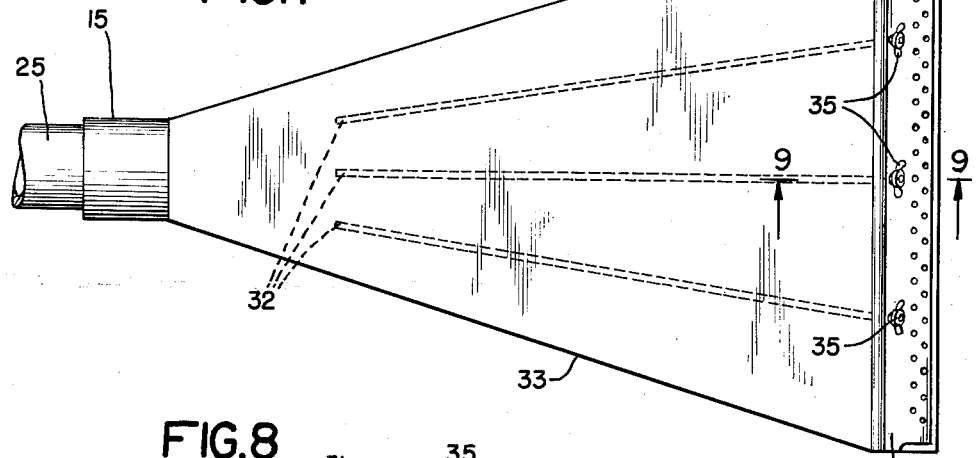
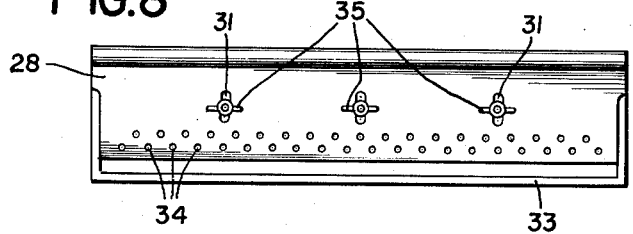
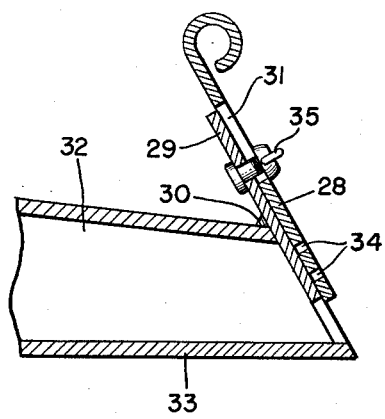
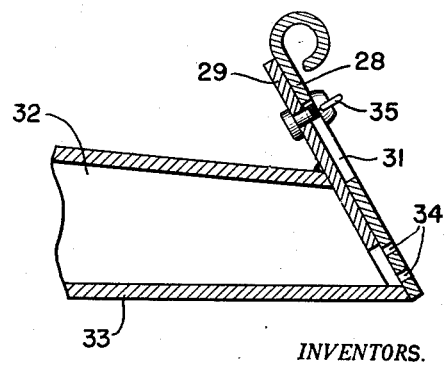
INVENTORS.
JAMES FAULKNER
AUGUST TOTH
BY *H. C. _____*
ATTORNEY.

Patented Sept. 2, 1952

2,609,240

UNITED STATES PATENT OFFICE 2,609,240

CONTROLLED DISCHARGE FOAM NOZZLE

James Faulkner, Nutley, and August Toth, Clark, N. J., assignors to Pyrene Manufacturing Company, Newark, N. J., a corporation of Delaware Application December 13, 1949, Serial No. 132,706

16 Claims. (Cl. 299—154)

This invention relates to means for controlling the pattern of the discharge of fire-extinguishing foam from a nozzle by which the said foam is produced, the said controlling means being designed to effect a fan-shaped pattern of the foam discharge which may take the form either of a spray or of a solid flat stream the thickness of which may be varied at will.

Heretofore it has been customary in the fire-extinguishing art to employ a play-pipe having a circular discharge orifice for projecting a stream of foam produced by a nozzle to which the play-pipe is attached. The pattern of the foam discharge produced by that type of play-pipe is obviously a solid round stream of foam at the orifice. We have found that more effective results in fire extinguishing can be obtained by discharging the foam from the nozzle in a fan-shaped form. This enables spreading a foam layer quickly and uniformly over the seat of the fire which may, for example, be at the surface of a body of oil in a tank. Such fan-shaped discharge may take the form of a flat blanket of foam, the thickness of which may be varied at will, or it may take the form of a fan-shaped foam spray, the choice depending upon the situation to be dealt with.

An object of the present invention has been to provide a play-pipe which is adapted to convert the discharge of foam or a foam forming mixture from the circular orifice of a foam producer or nozzle into a fan-shaped flat discharge of a solid blanket of foam, the thickness of which may be varied at will.

Another object has been to provide a play-pipe adapted to convert a circular stream of foam or foam-forming mixture into a flat fan-shaped spray of foam.

A further object has been to provide a play-pipe adapted to discharge a flat, broad discharge of foam either as a solid blanket or as a spray, at will.

In attaining the foregoing objects, a fan-shaped play-pipe is provided and so constructed as to insure the delivery of a uniform blanket of foam, in either solid or spray form, over a wide area, provision being made for varying the thickness of the foam blanket. This invention will be clearly understood from the following description when read in connection with the attached drawings of which:

Fig. 1 is a view of a foam-forming nozzle to which is attached a fan-shaped play-pipe having an adjustable orifice, the nozzle being shown in section;

Fig. 2 is a cross-sectional view of the play-pipe along the axis 2—2 of Fig. 1;

Fig. 7 shows another form of adjustable, fan-shaped play-pipe in which the adjustability at the discharge end is effected by a gate located thereat;

Fig. 8 is a front end view, upon a smaller scale, of the play-pipe shown in Fig. 7;

Figure 3:
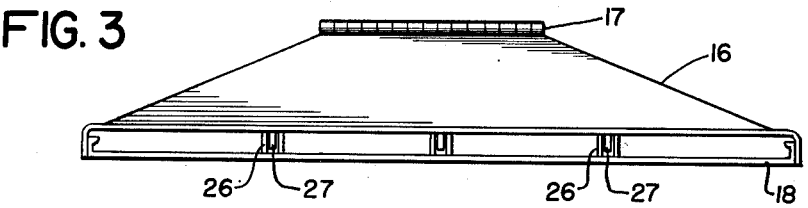
Fig. 3 is a front end elevational view of the play-pipe shown in Fig. 1.
Figure 4:
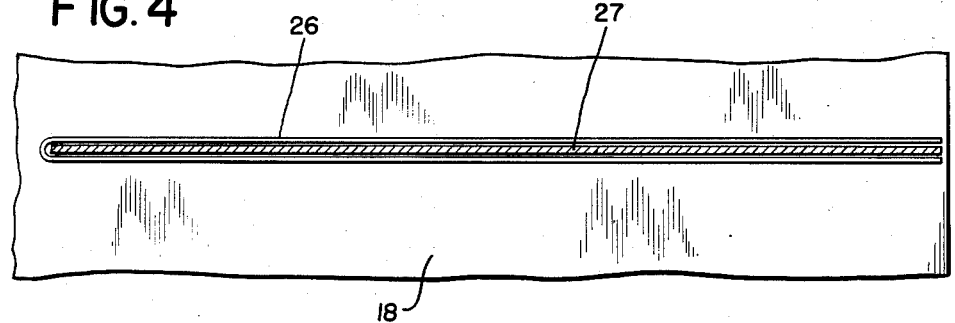
Fig. 4 is a detail view in horizontal section along line 4—4 of Fig. 2, showing the construction of one of the straightening vanes employed in the play-pipe.

And Figs. 9 and 10 are vertical cross-sectional views of the gate shown in Figs. 7 and 8 taken along the line 9—9 of Fig. 7, but upon a larger scale.

Fig. 1 shows a nozzle 1 to which is fastened a play-pipe 15 by means of which the foam produced by the nozzle may be distributed in fan-shaped form as hereinafter described. While this nozzle may be of any of the well known types, a preferred form is that described in the co-pending application of James Faulkner, Serial No. 96,909, filed June 3, 1949. That type of nozzle, as shown in Fig. 1, has a threaded end 2 designed for connection to a hose or pipe-line 20 by which water under the desired pressure from any suitable source may be applied to the nozzle. Across the input to the nozzle is a screen 3, the purpose of which is to prevent foreign matter from entering the nozzle. Near the midsection of the nozzle there is provided a wall having therein a plurality of apertures such as that designated 4, through which some of the water under pressure that passes through the screen 3 enters the chamber 5. A baffle member 6 having therein a series of spaced openings 7 permits the flow of water from the chamber 5 to the discharge orifice 8. The remainder of the stream of water that passes through the screen 3 enters the nozzle element 9 which is coaxial with another nozzle member 10 into which the member 9 discharges a jet of water. The forward end of element 9 is surrounded by a space 21 which is connected by the duct 11 to a source of foam stabilizer (not shown), the connection including a hose 22 having at one end means for connecting it to the nozzle 1, and, at its other end, a screen 12 through which the stabilizer from the said source passes. The connection between the foam stabilizer source and the nozzle is such that the stabilizer will be drawn by suction into the stream of water passing through members 9 and 10, and the mixture of water and stabilizer will then be projected through a throat 25 at the forward end of the nozzle which, as shown, is more constricted than the preceding portion 13 of the nozzle, the purpose of which will be presently explained. The portion 13 of the nozzle has a plurality of openings in the wall thereof through which air may be drawn by aspiration into the constricted portion 25 and thence will pass with the water and stabilizer into the play-pipe 15. This type of nozzle is based upon the principle of the invention set forth in the patent to Lewis G. Morris Timpson, No. 2,386,918 dated October 16, 1945, and its purpose is to provide a jet of finely divided spray.

The play-pipe, which is fastened to the discharge end of the nozzle by means of rivets, screws, or other suitable means, is fan-shaped and its cross-sectional form varies throughout its length, being circular in form, at the place of its connection to the nozzle, then changes to rectangular form, varying from a substantially square cross-section to an elongated flat rectangle at the extreme outer end thereof, as shown in Fig. 3. The minimum area of the discharge orifice of the play-pipe should be less than the area of the circular portion which fits the discharge orifice of the nozzle.

The forward portion of the play-pipe is made in two parts, the upper part 16 being hinged at point 17. The top and bottom members 16 and 18 are so designed and proportioned that the sides of the members will overlap as shown clearly in Figs. 3 and 5. The dimensions of the top and bottom members should be such as to provide a tight fit where the members overlap in order to prevent leakage of the foam along the line of contact. The adjustability of the top and bottom members permits variation in the size of the discharge orifice of the play-pipe whereby the thickness of the sheet of foam discharged therefrom may be varied to meet the conditions to be dealt with. The top member 16 has an arcuate or inclined slot 36 in each side thereof, as shown in Fig. 2, that is in line with a hole in the bottom member 18, through which passes a bolt having a wing nut 37 thereon by which the members may be securely held in such position as to ensure the desired thickness of the sheet of foam discharged.

Figure 6:
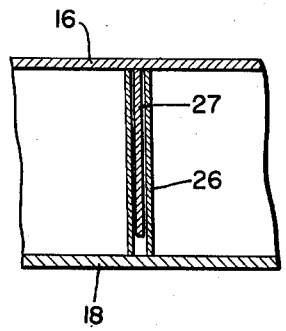
Fig. 6 is a detail view in transverse, vertical section along the line 6—6 of Fig. 2.

In order to effect the proper distribution of the foam prior to its discharge from the orifice, a plurality of vanes, preferably three in number, are provided. While the vanes may take a variety of forms, a satisfactory form is that shown in Figs. 2 and 6. That type of vane comprises two parts, one of which, designated 26, is U-shaped and is attached to the lower member 18 of the play-pipe, and the other part, designated 27, is attached to the upper member 16 of the play-pipe in such position that the upper part 27 of the deflecting vane will lie within the U-shaped part 26 attached to the lower member of the play-pipe. The distributing vanes serve to guide the foam that emerges from the circular orifice of the nozzle so as to distribute it evenly over the cross-sectional area of the play-pipe and bring about the uniform distribution of the foam at the orifice of the play-pipe. The formation of the foam which, as explained in said co-pending application of Faulkner, begins in the constricted portion 25 of the nozzle, is completed in the play-pipe by the turbulence created therein by the frictional effect of the walls of the play-pipe upon the foam passing therethrough, so that the foam emerging from the orifice of the play-pipe will be fully formed.

By means of the fan-shaped play-pipe, the orifice of which is adjustable as to the height of the opening and which has therein a plurality of vanes for effecting the uniform distribution of the foam within the play-pipe, there will be produced a fan-shaped blanket of foam having, at the point of discharge, the thickness represented by the height of the opening of the orifice of the play-pipe. Such a blanket of foam may be spread over the surface of a body of burning oil, or the like, much more rapidly and effectively than foam discharged from a circular orifice. However, it has been found important to bring about uniform distribution of the foam throughout the blanket discharged, and this is accomplished by the distributing vanes.

Figure 5:
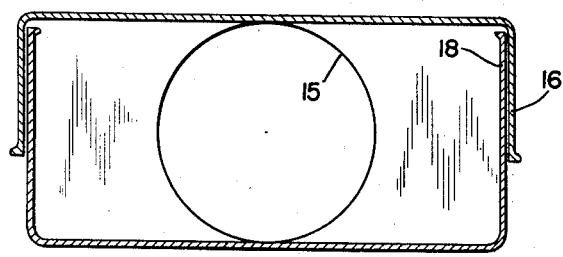
Fig. 5 is a cross-sectional view through the play-pipe along the line 5—5 of Fig. 1.

In a preferred form of a play-pipe of the type shown in Fig. 1, the distance along the axis 2—2 from the discharge orifice of the play-pipe to the line 3—3 where the flared portion of the play-pipe meets the discharge orifice of the nozzle, is 16″. The movable upper member is 14″ in length and is hinged at a point 2″ in front of the line 3—3. At that line the play-pipe is circular in form with a diameter of $1\frac{15}{16}''$; but at a point 1½″ therefrom toward the discharge orifice of the play-pipe, its cross-sectional form is a rectangle approximately 2½″ wide and 1⅞″ high. Further toward the orifice at the line 5—5, the cross-sectional form and the dimensions are as shown by Fig. 5, which is a full scale representation of that section. The discharge orifice of the play-pipe, when adjusted for minimum opening, is a flat rectangle 11″ in width and ¼″ in height. Each U-shaped vane should be about 12″ in length and should be so positioned within the play-pipe, that the leading edge of that vane would be about 2″ from the hinge on the upper member of the play-pipe as shown in Fig. 1, and the vane should terminate at the discharge orifice of the play-pipe. Each U-shaped vane should have the same height as the orifice, namely, ¼″, and the vane should be so formed that its upper edge slopes upwards from the orifice toward the leading edge of the vane, the angle of the slope being the same as that of the hinged member of the play-pipe when adjusted for minimum discharge thereby serving as a support for the hinged member. The height of the vane at the leading edge would, of course, depend upon the degree of slope. The space between the sides of a U-shaped vane should be just sufficient to encase the vane attached to the upper member which is designed to coact with the U-shaped vane. The overall thickness of the encased vane should be such as to minimize obstruction in the foam nozzle. At the discharge end the vanes should be evenly spaced to provide uniformly distributed foam discharge. On the leading edge the vanes should be located in such a way that the width of each outer space, namely, that between the sidewall of the play-pipe and the nearest side of a U-shaped vane, should be not less than 1½ times the width of one of the centrally located spaces through which the foam stream passes. This compels the foam stream to divide proportionally and thus prevents it from passing entirely through the central spaces. For the sake of clarity, three vanes only have been shown but the number may be varied depending upon the specific conditions involved or the results desired.

Another form of the invention, which is shown in Figs. 7 to 10, inclusive, employs a form of play-pipe which is a rigid, unitary structure in which the adjustability of the height of the discharge orifice is obtained by a gate located at that point. The sidewalls and the bottom of the play-pipe at the discharge orifice are bent so as to form flanges which are intended to act as guides and retainers for the gate which is adapted to be moved up and down within limits and be held at a desired position within those limits by means of the wing nuts 35 shown in Figs. 7 and 10, inclusive. The flanges thus serve as a protection to the gate and also to strengthen the play-pipe.

Gate 28, which is shown on an enlarged scale in Figs. 9 and 10, is slidably supported by the member 29 rigidly fastened by welding or brazing to the upper side of the play-pipe at the orifice thereof as indicated at point 30. The gate 28 has therein a plurality of slots 31 through which pass the bolts having the wing-nuts 35 thereon by which the gate may be secured at the desired point of opening. The lower portion of the gate is solid and serves to determine the height or thickness of the solid foam blanket discharged, depending upon the height to which the gate is adjusted along the member 29. Above the lower, solid portion of the gate, there is provided a plurality of perforations 34 arranged in rows extending across the entire width of the gate. The rows of perforations are so positioned that when the gate is lowered, as shown in Fig. 10, the holes will be below the lower edge of the supporting member 29. With the gate in that position the foam flowing through the play-pipe will pass through the holes in the gate and will emerge therefrom in the form of a blanket of foam spray.

When the gate is raised to its upper-most position, its lower edge will be substantially in line with the lower edge of the supporting member 29. With that adjustment of the gate the stream of foam will emerge from the orifice of the play-pipe in an unbroken, fan-shaped sheet of foam having the same thickness at the point of discharge as the height of the opening below the member 29. The thickness of the solid sheet of foam at the point of discharge may, of course, be varied within limits by the adjustment of the position of the gate 28 upon the supporting member 29, the limit being reached when, in the course of lowering the gate, the upper row of perforations appears below the lower edge of the supporting member 29. If desired, the gate may be so formed and positioned that part of the foam will flow through the lower row of perforations and the remainder will flow as a solid sheet of foam through the space between the lower edge of the gate and the bottom of the play-pipe. In any adjustment of the gate, a fan-shaped discharge will result. To effect uniform distribution of the foam across the width of the discharge orifice of the play-pipe, a plurality of distributing vanes 32 is provided, as shown in Fig. 7, which, though differing in form from those shown in Figs. 1 and 2, serve the same purpose. Since the height of the play-pipe as a whole remains unchanged, each distributing vane may be in the form of a single wall extending from the top to the bottom of the play-pipe. The vane at Fig. 7 should terminate at the discharge orifice and should have the same length as that shown in Fig. 1, when the play-pipes of those figures are of the same length. The vanes may be integral with the top and bottom walls of the play-pipe or secured thereto in any suitable way. In a preferred form of the play-pipe shown in Fig. 7, the discharge orifice should be ¼" high when the gate is wide open as shown in Fig. 9. The other dimensions of the play-pipe should be the same as those of the preferred form of play-pipe shown in Fig. 1, except where the difference in design necessitates a departure from those dimensions.

The form of the invention shown in Figs. 7 to 10, inclusive, not only provides a fan-shaped pattern of discharge, but also makes possible the changing of the form of that discharge from a solid sheet or blanket of foam to a spray of foam, and vice versa, or to a combination of both, the selection depending upon the requirements of a given situation.

While the invention has been disclosed in several forms of embodiment, it is capable of embodiment in other and different forms without departing from the spirit and scope of the appended claims.

What is claimed is:

1. A fan-shaped play-pipe designed for connection to a source of air-foam for projecting said air-foam for fire extinguishing purposes, said play-pipe having an input orifice at its narrow end to receive the foam constituents from the source thereof and having a rectangular output orifice through which fully-formed air-foam may be discharged, the width of said orifice being large relative to its height and having longitudinally positioned vanes therein to distribute the flow of foam substantially uniformly throughout the width of the discharge orifice of the play-pipe, the leading edge of said vanes being at substantially the same distance from the input orifice of the play-pipe.

2. A fan-shaped play-pipe as defined by claim 1 further characterized by means to change the height of the output orifice, the said change being uniform across the width of the said orifice.

3. A play-pipe for projecting air-foam for fire-extinguishing purposes comprising, in combination, a fan-shaped chamber having an input orifice at its narrow end for connection to a source of air-foam, an output orifice for the discharge of said air-foam, said output orifice having the form of an elongated rectangle, a plurality of distributing vanes longitudinally positioned within said chamber, and means to vary at will the area of the discharge orifice of said chamber while maintaining its rectangular form.

4. A play-pipe for projecting air-foam for fire-extinguishing purposes having a hollow body with input and output orifices, the width of the output orifice being large relative to its height to effect the discharge of a fan-shaped sheet of foam, said body being so formed as to vary at will the height of the output orifice, the variation being uniform throughout the width of the orifice.

5. A play-pipe for projecting air-foam for fire extinguishing purposes having a fan-shaped hollow body with input and output orifices, the width of the output orifice being large relative to its height to effect the discharge of a fan-shaped sheet of foam, guiding means within said body comprising a plurality of vanes longitudinally positioned therein and fanning outwardly from the input end of said body to the output orifice thereof to effect substantially uniform distribution of the foam across said output orifice, the said body being so formed as to vary at will the height of said output orifice the variation in height of the orifice being uniform throughout its width whereby the thickness of the sheet of foam may be controlled.

6. A play-pipe as defined by claim 5 in which the said body is so constructed that the foam discharge may take the form of either a solid sheet of foam or a spray of foam.

7. A play-pipe for projecting air-foam for fire-extinguishing purposes comprising, in combination, a fan-shaped hollow body having input and output orifices, said body being so formed that the output orifice has the form of a long narrow substantially rectangular opening, guiding means positioned longitudinally within said body to distribute said foam substantially uniformly across said opening and means adjustable at will to change the height of said opening said change being substantially uniform across the width of said opening.

8. A play-pipe for projecting air-foam for fire-extinguishing purposes comprising, in combination, a fan-shaped hollow body having input and output orifices, the width of said output orifice being great relative to the height of the orifice, a gate, movable at will, arranged to vary the height of the opening of the output orifice, and means within said body to distribute the foam substantially uniformly across said output orifice.

9. A play-pipe of the type defined by claim 8 in which the said gate has perforations across the width thereof whereby the discharge from the play-pipe will take the form of a fan-shaped spray of foam when the said gate is in one position.

10. A play-pipe for projecting air-foam for fire-extinguishing purposes comprising, in combination, a fan-shaped hollow body having a discharge orifice the width of which is large relative to its height, an input orifice through which a jet of fire-extinguishing foam may pass into the said hollow-body, guiding means in said body comprising a plurality of vanes longitudinally positioned to distribute the foam substantially uniformly over the area of the discharge orifice, said body having means connected therewith to permit the alteration at will of the height of said discharge orifice the alteration being uniform across the width of the opening.

11. A play-pipe for projecting air-foam for fire-extinguishing purposes comprising, in combination, a fan-shaped hollow-body formed by two coacting members and having an input orifice through which a jet of fire-extinguishing foam may be directed into said body of the play-pipe, and an output orifice for the discharge of air-foam therefrom, a plurality of guiding vanes in said body to effect substantially uniform distribution of the foam over said discharge orifice, the said body being so formed as to effect the changing of the area of said output orifice by altering the relative position of the parts of said body without altering the rectangular shape of said output orifice.

12. A play-pipe for projecting air-foam for fire-extinguishing purposes comprising a fan-shaped hollow-body having input and output orifices, said body being formed by two coacting members, relatively movable, which form the walls and the output orifice of the body, the side walls of one member overlapping those of the other member, and the area of the output orifice being determined by the adjustment of the position of the coacting members.

13. A play-pipe as defined by claim 12 further characterized by the inclusion of a plurality of vanes in said body longitudinally positioned and fanning outwardly toward the output orifice as to effect substantially uniform distribution of foam over the area of the output orifice.

14. A play-pipe for projecting air-foam for fire-extinguishing purposes comprising a fan-shaped hollow body having input and output orifices, said body being formed by two coacting members, relatively movable, which form the walls and the output orifice of said body, the side walls of one member overlapping those of the other member, and a plurality of vanes within said body for distributing said foam substantially uniformly along said output orifice, each vane consisting of two parts, each of which is attached to one of said members, one of said parts being arranged to shift transversely in relation to the other part of said vane.

15. A play-pipe as defined by claim 14 further characterized in that said other part of the distributing vane is a U-shaped member so positioned that the curved portion of the U is toward the input orifice and that said one of said parts of the vane will fit between the sides of the U.

16. The play-pipe for projecting air-foam for fire-extinguishing purposes, comprising a fan-shaped hollow-body having input and output orifices, said body being formed by two coacting members, one of which is movable, which form the walls and the output orifice of the body, the area of the output orifice being determined by the adjustment of the coacting members, and a plurality of vanes each consisting of two coacting parts, each part being attached to one of said members, one of said parts of the vanes being of such a size and shape as to support the said movable member when adjusted for minimum area of output orifice.

JAMES FAULKNER.
AUGUST TOTH.

REFERENCES CITED

The following references are of record in the file of this patent:

UNITED STATES PATENTS

| Number | Name | Date |
|---|---|---|
| 157,256 | Wiard | Nov. 24, 1874 |
| 798,674 | Haas | Sept. 5, 1905 |
| 813,254 | Sweeney | Feb. 20, 1906 |
| 1,209,386 | Brickey | Dec. 19, 1916 |
| 1,233,417 | Stephan | July 17, 1917 |